United States Patent [19]

Butsch

[11] 4,092,687
[45] May 30, 1978

[54] DISC FILE ASSEMBLY
[75] Inventor: Otto R. Butsch, Ann Arbor, Mich.
[73] Assignee: Sycor, Inc., Ann Arbor, Mich.
[21] Appl. No.: 721,040
[22] Filed: Sept. 7, 1976
[51] Int. Cl.² ............................................. G11B 5/48
[52] U.S. Cl. ...................................... 360/102; 360/97
[58] Field of Search ................... 360/102, 103, 97–99, 360/133, 100

[56] References Cited

U.S. PATENT DOCUMENTS

| | | | |
|---|---|---|---|
| 3,624,624 | 11/1971 | Johnson | 360/100 |
| 3,710,357 | 1/1973 | Buslik | 360/97 |
| 3,723,980 | 3/1973 | Gabor | 360/98 |
| 3,740,735 | 6/1973 | Gabor | 360/97 |
| 3,825,951 | 7/1974 | Katsumori et al. | 360/98 |
| 3,839,734 | 10/1974 | George et al. | 360/102 |
| 3,849,800 | 11/1974 | Cuzner et al. | 360/97 |

Primary Examiner—John H. Wolff
Attorney, Agent, or Firm—Price, Heneveld, Huizenga & Cooper

[57] ABSTRACT

A disc file structure includes a rigid support casting as a structural foundation which rotatably mounts a disc drive spindle assembly, including a shaft, a motor connected to the shaft at one end and an air pump impeller connected to the shaft at the other end. Housing enclosure portions attach to the support casting so that the resulting structure forms an integral sealed air chamber which defines a single air flow path for both cooling the assembly and for aerodynamically supporting the read/white heads.

30 Claims, 5 Drawing Figures

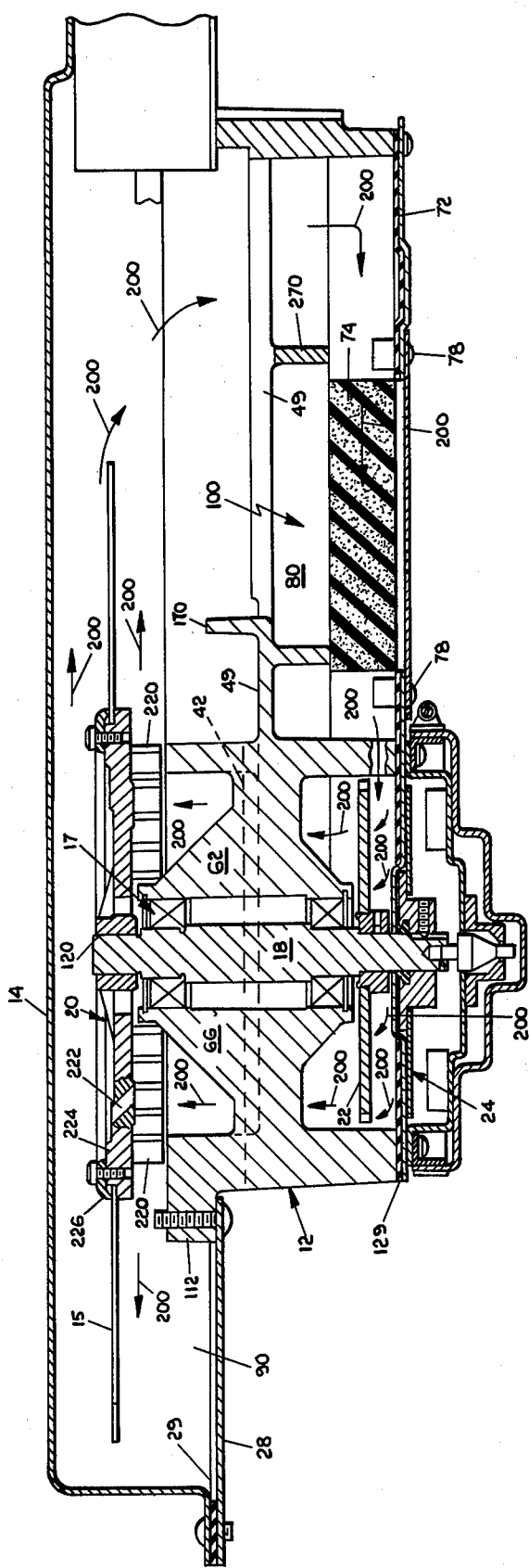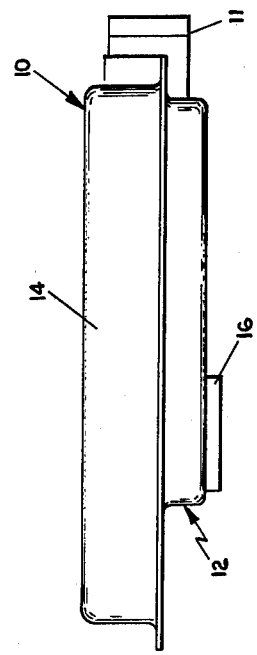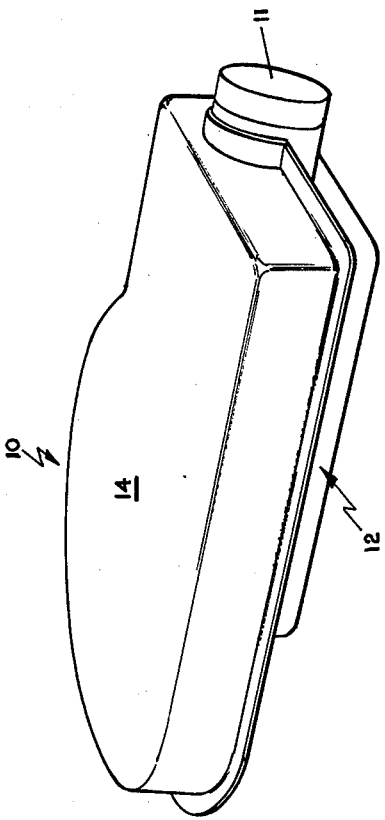

DISC FILE ASSEMBLY

BACKGROUND OF THE INVENTION

Magnetic disc recorders, or file assemblies, known and used heretofore usually provide for two entirely separate air flow paths within the assembly, particularly where rigid or "hard" discs are used, as is most often the case. One such air flow path is used for cooling motors and other heat-producing elements of the assembly, and the other air flow path is used for aerodynamically supporting a read/write head on a thin film of air passing over the head and across the rotating disc. The head is shaped so that air passing between the head and the disc lifts or supports the head, thereby aerodynamically "flying" it above the surface of the disc. The reason for separating the two air flows is the important requirement for one such path of keeping all contamination away from the head and disc. The air passing over the head and disc must be cleaned and filtered and is usually recirculated within a closed system. In contrast, the air for cooling is typically not in a closed system, since there is no requirement that such air be free of contaminants, and a relatively large volume of ambient air is typically drawn from the immediate area, forced through the air flow path to provide for cooling, and then expelled into the environment.

Such a division of air flow paths is disadvantageous in many ways, because at least two completely different air-moving means must be used and of course separate structures must be used to define the dual air paths. Since the paths must be mutually exclusive, the complexity of the two different paths adds considerably to the difficulty and expense of manufacturing.

SUMMARY OF THE INVENTION

This invention utilizes the concept of a single, sealed air chamber, and a single air flow path, for both cooling the disc file assembly and for aerodynamically flying the head. Also, a disc file assembly in accordance herewith includes a support casting which rotatably supports the disc-mounting and driving spindle, and the latter comprises a driving shaft, a motor connected to the shaft, and an integral impeller air pump connected to the spindle shaft. The support casting is shaped so that in combination with the drive spindle and impeller pump a single air path is formed which is controlled and directed to accomplish its multiple purpose.

The support casting includes two concentric cylindrical walls with connecting, circumferentially spaced, radial flanges. An opening inside the innermost of the concentric walls receives the spindle shaft. The impeller pump is a vaned disc supported directly on the spindle, which when the spindle rotates pumps a flow of air between the two concentric walls and around, and over, the rotating disc, thereby flying the aerodynamically-shaped head.

BRIEF DESCRIPTION OF THE DRAWINGS

FIG. 1 is a side perspective view showing the basic overall nature of a disc file assembly in accordance with an embodiment of the invention;

FIG. 2 is a side elevation of the disc recorder of FIG. 1.

FIG. 3 is an enlarged sectional side elevation of assembly in accordance with an embodiment of this invention as seen along the plane III—III of FIG. 4;

DETAILED DESCRIPTION OF THE PREFERRED EMBODIMENT

Figure 4:
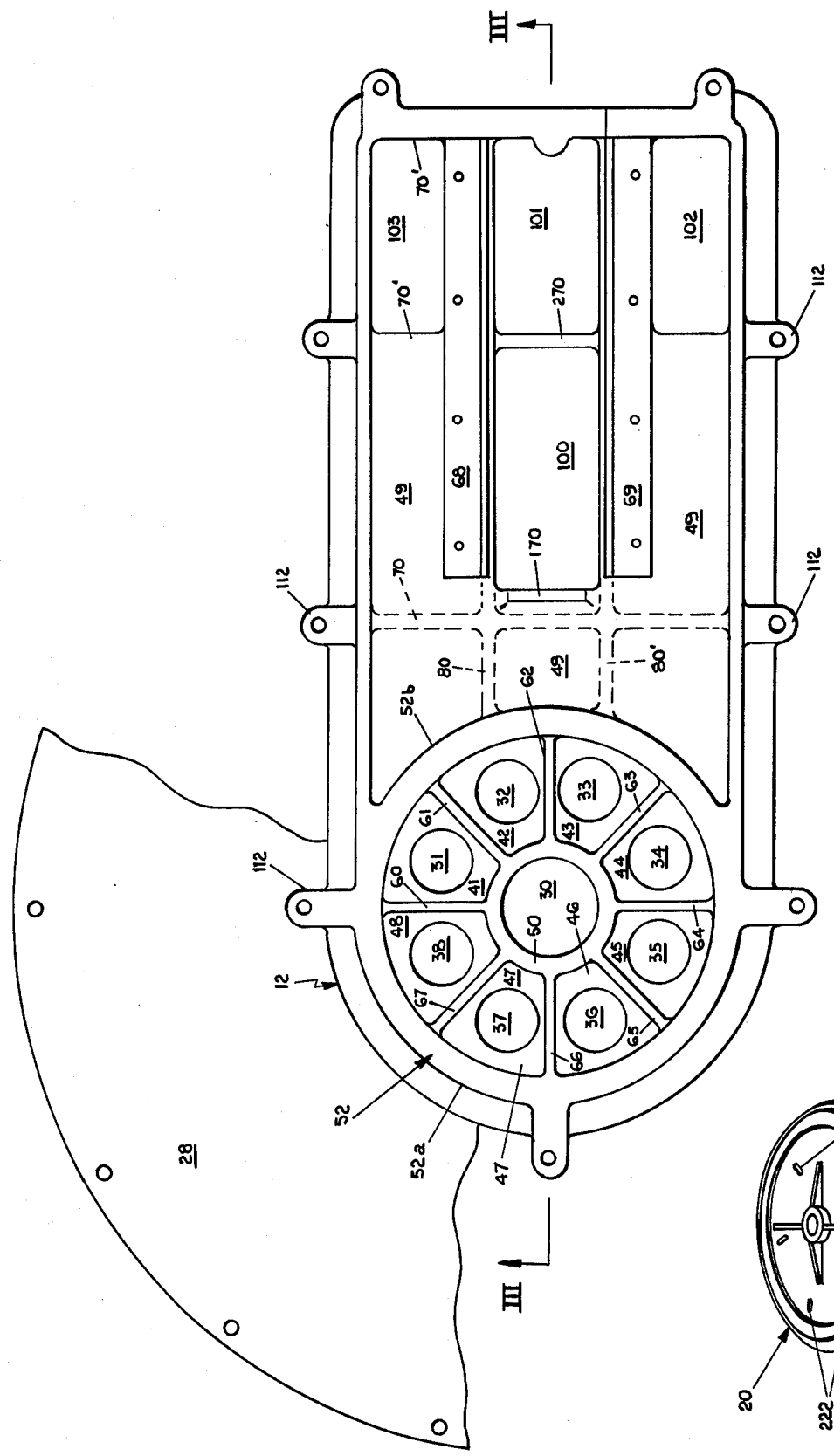
FIG. 4 is an enlarged, fragmentary, overhead plan view of a structural casting for a disc file in accordance with an embodiment of this invention.

Referring to FIGS. 1 and 2, an example of disc file assembly 10 in accordance herewith has a structural casting 12, which supports a top cover 14 and a bottom motor cover 16. Mounted within casting 12 is a drive spindle assembly 17, seen in FIG. 3, for rotating a magnetic recording disc 15. Basically, the drive spindle assembly includes a shaft 18 and a number of elements concentrically mounted thereon, including an impeller pump 20, a transducer wheel or disc 22, and a DC motor 24 for rotating shaft 18 and the components of the drive assembly connected thereto. The particularities of this assembly are set forth more fully in copending application Ser. No. 721,042 filed Sept. 7, 1976, incorporated herein by reference.

The casting 12 serves several functions simultaneously, including acting as the central structural element of the disc file and mounting the various operative components thereof, as well as supporting the top cover 14, and defining the air flow passages of the apparatus, which together from the single composite air flow path serving both the head-flying and the equipment-cooling functions mentioned above.

Referring to FIG. 4, a plan view of casting 12 above without the housing 14 and without the drive spindle assembly 17, shows the casting to have a cylindrical, circular-section spindle opening 30, and an array of circular openings 31–38 inclusive circumferentially spaced around opening 30. The central opening 30 is defined by an inner cylindrical casting wall 50, and there is an outer cylindrical casting wall 52 which is concentric with inner cylindrical wall 50 and spaced from the latter. The circular openings 31 through 38 are formed in web sections 41–48 inclusive (FIGS. 3 and 4) which are disposed transversely to and which extend between cylindrical walls 50 and 52. Flanges 60 through 67 comprising radial ribs interconnect cylindrical walls 50 and 52. Flanges 60 through 67 are positioned and spaced so that there is one such flange located between each two adjacent circular openings 31 through 38.

Generally speaking, casting 12 has vertical side walls, three of which are straight and flat, forming a rectangular box-like shape, and one of which is a semicircle (see FIG. 4) which spans the open end portion of the other three sides and forms a portion of cylindrical wall 52. Within the box-like portion of the casting, a plurality of transverse flanges 70 and longitudinal flanges 80 interconnect the interiors of the rectangular walls to reinforce the casting.

As best seen in FIG. 3, the cover 14 is a dish-shaped member which fits atop, and is supported upon a sheet metal or other such flat support 28, which in turn is secured to the underside of a series of support lugs 112 forming a part of the casting 12, such that the flat support 28 in effect forms a generally rigid, but lightweight, outward extension of the casting 12 which supports the cover 14 in place, forming an air compartment 90 therebetween. A sealing member 29 formed of soft resilient material, preferably closed-cell polyvinylchloride foam, provides a semi-hermetic seal between support 28 and housing 14, essentially trapping the air between and preventing its escape, but permitting a very minor amount of air to pass between these two members, depending upon pressure conditions inside the housing, as discussed subsequently.

With further reference to FIG. 4, it will be observed that the upper part of the casting 12 (as seen from the orientation of FIGS. 1, 2, and 3) defines a first pair of through-openings 100 and 101, disposed in tandem and separated by a transverse wall 270 disposed in the bottom half of the casting (FIG. 4). In the top half of the casting, openings 100 and 101 are flanked on either side by a pair of elongated, flat-topped mounting pads 68 and 69 whose intended purpose is to support and mount a movable carriage (not specifically shown) for the recording heads, which move toward and away from the spindle-mounting part of the apparatus shown at the left in FIG. 4. For the purposes of the present invention, such carriage may be considered as conventional, utilizing appropriate guide rods and bearings, or the like. A stop rib 170 may be provided to mark the forward extremity of the allowable carriage travel. On either side of through opening 101, the casting also defines a pair of lateral openings 102 and 103, which also extend downwardly into the bottom part of the casting, through a medial wall or web 49 in the same plane as web portions 41-48 disposed between cylindrical walls 50 and 52, described above. The otherwise open bottom of the casting is closed by a sheet metal or other such panel 72 (FIG. 3) which is held in place by appropriate screw fasteners which engage tapped holes in the casting. Preferably, a seal 129 similar to member 29, mentioned previously, is used along the junction of panel 72 and casting 12. Closure panel 72 forms an access opening in which a filter element 74 is insertable and removable, such filter element preferably being a three-micron filter, for example, a membrane-labyrinth filter or other commercially available type. As illustrated, the access opening for filter 74 is covered by a sheet closure 76, which may be removably held in place by screws or "Camlok" fasteners 78 which pass through both panels 72 and 76. An additional seal may be used between panels 72 and 76.

Figure 5:
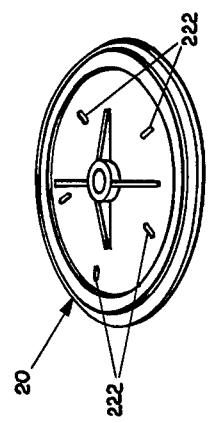
FIG. 5 is an overhead plan view of the impeller member shown along without the recording disc, and on a reduced scale.

Impeller pump 20 (FIGS. 3 and 5) is disc shaped, with a central opening 120 concentric with the axis of the recording disc 15. Extending downwardly parallel to its axis, and from around a peripheral portion thereof, impeller pump 20 has a plurality of spaced vanes 220 (FIG. 3). Vanes 220 are plate-like, generally rectangular, bodies aligned at an angle to the radii extending to each individual vane. The spacing between adjacent vanes provides a primary path for air flow, which is pumped by the vanes from below the pump into the interior space surrounded by the vanes and outward into the space beyond the vanes, whose extending tips closely approach the top of casting 12. A secondary, but nonetheless significant, path for air flow through impeller 20 is by way of a series of passages 222 (FIGS. 3 and 5) which extend angularly through the impeller, from the side carrying the vanes 220 through the opposite side, at an acute angle to the plane of the impeller (preferably about 30°), and with a shape which is circular in a transverse section relative to the passage itself, and therefore oval relative to the plane of the impeller. As indicated in FIG. 5, the openings 222 are preferably disposed on a circular locus near the outer periphery of the impeller disc, for example just inside a raised circular island 224 which serves as a mount for a series of clips 226 by which the recording disc 15 is secured to the impeller wheel. As also indicated, the axis of the openings 222 relative to a diameter passing through the end opening of each is preferably at an angle of about 60°.

It will be recognized that the disc recorder assembly described in the preceding paragraphs is essentially a sealed unit, having a single air supply which is in effect sealed inside the assembly, between the top cover 14 and the bottom plates or covers 72 and 76, from which the same stream of air moved along the same flow path is used to cool the motor and other rotary parts of the disc drive and also used to aerodynamically fly the recording heads near the surface of the disc.

The single, or primary, path along which the air enclosed within the device moves as illustrated by the arrows in FIG. 3 which are designated by the numeral 200. More particularly, when the motor 24 is energized to rotate the recording disc 15, the vanes 220 carried on the disc-mounting member 20 act as an air pump which expels air radially of the impeller member, thereby drawing air upwardly along the entire drive spindle assembly 17 and cooling the latter. That is, each of the radial ribs 60-67 inclusive not only supports the drive spindle assembly mounted centrally thereof, but also acts as a heat-conductive element which rapidly carries heat away from the drive spindle assembly and outwardly thereof, the entire casting 12 preferably being of an aluminum alloy or like material which is not only lightweight and strong, but also is a good conductor of heat. The radial ribs just noted (which may be referred to as fins, or "fin portions") are cooled by the air rushing along their lengths (i.e., from bottom to top as seen in FIG. 3) and, additionally, heat from each such rib, or fin portion is conducted into the web portions 41-48 inclusive (which may also be thought of as fins, or fin portions), disposed transversely between the various ribs 60-67, all of which thus serve to cool and thermally balance, the spindle assembly as well as to structurally support it. The air flowing upwardly along the spindle assembly and over the ribs and web portions just noted passes through the openings 31-38 inclusive formed through each such web portion and, as it flows along its closed path inside the casting, the air flow uniformly distributes heat throughout the outer parts of the casting to which heat may also pass by conduction. Of course, all of the outer walls and surfaces of the casting dissipate heat from the casting outwardly into the surrounding area, and in this manner the sealed recorder transfers heat to its environment and is cooled. Due to the relatively large amount of air which can be moved by an impeller such as that disclosed, particularly in the environment shown, together with the large amount of heat dissipation obtained from the design of the casting itself, the drive spindle assembly remains cool in operation, promoting long life of the entire unit.

The air drawn upwardly along the drive spindle is, as previously stated, expelled radially of the disc, both above and below the surfaces of the latter. Above the disc, the air flow passages 222 serve to expel spirally enlarging flat, streams of air which combine into a generally continuous annular stream flowing outwardly over the upper surface of the impeller wheel and over the upper surface of the disc 15, the amount of flow and velocity of such airstream being readily controllable by the geometry of the passages 222. Air expelled radially outwardly from the vanes 220 flows along the underside of the disc, thereby providing an extremely adequate supply of air for aerodynamically flying the recording heads. In this connection, the spacing of the lower edge of the vanes 220 above the surface of the casting may be varied to vent or spill excess air used for cooling of the casting but not needed for aerodynamic head-flying purposes.

After reaching the outer periphery of the disc 15, the air from the impeller wheel circulates around the inside of the curved forward end of outer housing 14 in a sweeping flow pattern which sends the air rearwardly of the housing, toward the openings 100, 101, 102 and 103 (FIGS. 3 and 4). From this point, the air naturally passes downwardly through such openings, being drawn back toward the direction of the motor 24 due to the effect of the intake side of the impeller pump. In so doing, the air passing through openings 100 and 101 may be used to help cool the head-moving carriage mechanism mentioned previously, including an actuating motor utilized for such purpose (such as that designated by the numeral 11 in FIGS. 1 and 2), while the openings 102 and 103 balance the air flow. All such air moving downwardly in the casting is thus drawn through the filter element 74, which extends across the entire width of the casting beneath the rib 70, thereby occupying the only available path for return air flow back to the impeller wheel. After passing through the filter element 74, the air once again enters the area of the motor 24, having free access to the area surrounding the encoder disc 22 mentioned previously. The phrase "primary air path" used herein is intended to broadly denote the basic nature of the air flow path just described, generally characterized by a continuous and circulating main flow which passes over the disc and which also cools the drive spindle to serve two purposes. Of course, it should be understood that it is not a departure from this concept, and the meaning of the phrase here defined, to compartmentalize or channel this primary flow into separate specific component streams which are essentially duplicative or cumulative in effect as by internal baffles or the like disposed generally parallel to the direction of the flow.

Thus, the disc recorder disclosed herein has an enclosed self-contained air system, although as previously indicated the air seals 29, 129 are not intended to be a perfect seal, allowing a certain limited amount of air flow through, depending upon pressure conditions within the disc enclosure. That is, when the disc drive is stopped for any period of time, the pressure conditions inside will of course be the same as ambient conditions. Upon initial startup of the drive spindle, the drawing effect of the rotating vanes will produce a low pressure condition along the spindle and at the bottom portion of the casting, particularly near the motor, and this condition may draw in a limited amount of air through the seals 29, 129, particularly in the area of the motor 24, and rearwardly thereof. As soon as this low pressure condition is corrected, however, a slight overpressure will have been created immediately about the pump 20, and, while steady-state running conditions within the enclosure may involve localized pressures slightly higher than ambient, higher pressure which might otherwise occur may be expelled outwardly through the seals, 29, 129. Thus, the pressure inside the enclosure may slowly rise and fall, or pulsate, slightly following initial startup; however, air flow conditions along the surface of the disc will be steady and continuous, promoting optimum recording conditions.

It will be appreciated that the basic underlying concepts of the invention may be subject to a number of embodiments other than that set forth above, which should accordingly be regarded as but one example. The actual scope of the invention should be determined by consideration of the ensuing claims, which should be regarded as embracing all reasonable embodiments of the inventive concept which utilize the underlying spirit thereof.

The embodiments of the invention in which an exclusive property of privilege is claimed are defined as follows:

1. A disc recorder construction, comprising in combination:
an enclosure, including an outer cover and means for supporting the cover in place thereupon to define therewith an enclosed structure, and including means for sealing the cover and support means to one another such that said enclosure is substantially sealed from air external to the enclosure; means defining a single main flow path for air within said enclosure; a recording disc and means mounting the same for rotation within said enclosure, said disc located with its recording surfaces at least partially within said main air flow path; means for rotating said disc within said enclosure, at least portions of said disc-rotating means being disposed within the enclosure and directly within said main air flow path, so that air moving in said path directly encounters said portions of said disc-rotating means while the air moves along such path; and air-impelling means for moving air within said enclosure along said main air flow path, the air which moves along said main air flow path passing over at least portions of said recording disc as well as over at least said portions of the means for rotating said disc, to cool the latter and also to facilitate recording, such as by providing a boundary air flow adjacent the disc for an aerodynamic transducer head and for removing dust particles or the like from the area of the disc.

2. The disc recorder construction of claim 1, wherein said means for rotating the disc includes a motor disposed at least partially within said air flow path for cooling of the motor by the flow of air moving along the flow path.

3. The disc recorder construction of claim 1, wherein said disc is disposed within said air flow path such that air moving therein flows over both sides of the disc.

4. The disc recorder construction of claim 1, wherein said means for rotating the disc includes a rotary shaft, and said shaft has a location at least partially within said air flow.

5. The disc recorder construction of claim 4, wherein said air flow path is in a direction generally parallel to the longitudinal axis of said shaft.

6. The disc recorder construction of claim 4, wherein said means for rotating the disc includes a motor disposed at least partially within said air flow path for cooling of the motor by the flow of air moving along the flow path.

7. The disc recorder construction of claim 6, wherein said disc is disposed within said air flow path such that the moving air flows over both sides of the disc.

8. The disc recorder construction of claim 4, including a heat-conductive support means for said shaft, for conducting heat away from the latter; said support means having heat-dissipation web sections disposed generally in said air flow path.

9. The disc recorder construction of claim 8, wherein said shaft support means includes at least portions forming a mount for a motor coupled to said shaft.

10. The disc recorder construction of claim 9, wherein said portions for mounting said motor include heat-conductive and heat-dissipating portions and such heat-dissipating portions are in said air flow path.

11. The disc recorder construction of claim 10, wherein said shaft support means and said motor-mounting portions comprise parts of an integral member which includes said means for supporting said outer cover.

12. The disc recorder construction of claim 11, wherein said integral member comprises a rigid central frame for the recorder providing a major portion of the structural rigidity thereof.

13. The disc recorder construction of claim 11, wherein said integral member defines portions of said air flow path.

14. The disc recorder construction of claim 4, wherein said air-moving means for impelling a flow of air comprises an element coupled to said rotary shaft to be driven thereby.

15. The disc recorder construction of claim 14, wherein said element is a rotary member mounted concentrically on said shaft.

16. The disc recorder construction of claim 15, wherein said rotary member comprises an impeller wheel having air-moving vanes.

17. The disc recorder construction of claim 14, wherein said element coupled to said shaft to be driven thereby includes means for mounting said disc for rotation.

18. The disc recorder construction of claim 17, wherein said element is a rotary member mounted concentrically on said shaft, and said means for mounting said disc include integral parts of said rotary member disposed in a symmetrical arrangement radially outward from the axis of said shaft.

19. The disc recorder construction of claim 18, wherein said rotary member comprises an impeller wheel having air-moving vanes.

20. A disc recorder, comprising in combination: a main support frame in the nature of a rigid cast structure, and covering closure means mounted on said frame to define therewith an enclosed compartment; an air seal disposed between said main support frame and said closure means, for minimizing air leakage therebetween; an enclosed air flow path within said compartment and defined at least in part by said cover, said flow path also defined by portions of said main support frame; a rotary disc-drive spindle shaft rotatably mounted on said main support frame inside said compartment, and means coupled to said shaft for supporting a recording disc inside said compartment for rotation by said shaft; said spindle shaft disposed in a location which is at least partially in said air flow path, for cooling of the shaft as a result of the air flowing in such path; air guide means for directing at least portions of the air flowing in said path over a surface of said disc; and air-moving means for circulating the air in said flow path in a continuing recirculating stream passing over said spindle shaft location, over said disc, and over said spindle shaft location once again.

21. The disc recorder of claim 20, including a filter disposed in said air flow path to filter the air circulated in said continuing stream.

22. The disc recorder of claim 20, wherein said air seal is pervious to air flow as a function of pressure within said sealed enclosure, such that air may pass into the enclosure from outside it if the pressure therein falls below air pressure outside the enclosure and air may pass out of the enclosure upon pressure therewithin exceeding a predetermined level.

23. The disc recorder of claim 20, wherein said main support frame defines at least one mounting boss for said spindle shaft, and including heat-conducting cooling means extending outward relative to said mounting boss and located in said air flow path.

24. The disc recorder of claim 23, wherein said heat-conducting cooling means includes fin portions extending longitudinally of said spindle shaft.

25. The disc recording of claim 24, wherein said cooling means also includes fin portions extending generally transversely outward relative to said spindle shaft.

26. The disc recording of claim 25, wherein certain of said transversely-extending fin portions bridge certain pairs of said longitudinal fin portions.

27. The disc recording to claim 26, wherein certain of said transverse bridging fin portions define air passage openings.

28. The disc recording of claim 23, wherein said main support frame defines an outer wall portion spaced laterally outward from said mounting boss, and said outwardly-extending cooling means is in heat-transferring contact with said outer wall portion.

29. The disc recording to claim 28, wherein an exterior surface of said outer wall portions is exposed to ambient air conditions outside the disc recorder.

30. The disc recording of claim 29, wherein said air flow path passes over inside surface portions of said outer wall portions.

* * * * *